R. E. HELLMUND.
SYSTEM OF MOTOR CONTROL.
APPLICATION FILED OCT. 7, 1915.

1,336,561.

Patented Apr. 13, 1920.
2 SHEETS—SHEET 1.

Switches

|   | 1 | 2 | 3 | 4 | 5 | 6 | 7 | 8 | 9 | 10 | 11 | 12 | 13 | 14 | 15 |   |   |
|---|---|---|---|---|---|---|---|---|---|---|---|---|---|---|---|---|---|
| A | O |   |   | O | O |   |   |   |   |   |   | O |   |   | O | A |   |
| B | O |   | O | O | O |   |   |   |   |   |   | O |   |   | O | R | 1 |
| C | O | O |   | O | O |   |   |   |   |   |   | O |   |   | O | T |   |
| D | O |   |   | O | O |   |   |   |   |   |   | O |   |   | O | R | 2 |
| E | O |   |   | O |   | O |   |   |   |   |   | O |   |   | O | A |   |
| F | O |   |   | O |   | O | O |   |   |   |   | O |   |   | O | R | 3 |
| G | O |   |   | O |   | O | O |   |   |   |   | O | O |   |   | A |   |
| H | O |   |   | O |   | O | O |   |   |   |   | O | O | O |   | R | 4 |
| I | O |   |   | O |   |   | O | O |   |   |   | O | O | O |   | A |   |
| J | O |   |   | O |   |   |   | O | O |   |   | O | O | O |   | R | 5 |
| K | O |   |   | O |   |   |   | O | O | O | O |   | O |   |   | A |   |
| L | O |   |   | O |   |   |   | O | O | O | O |   |   |   |   | R | 6 |
| M | O | O |   | O |   |   |   | O | O | O | O |   |   |   |   | T |   |
| N | O |   |   | O |   |   |   | O | O | O | O |   |   |   |   | A |   |
| O | O |   | O | O |   |   |   | O | O | O | O |   |   |   |   | R | 7 |

Accelerating Positions

WITNESSES:
Fred H Miller
D.C. Davis

INVENTOR
Rudolf E. Hellmund
BY
Wesley G Carr
ATTORNEY

R. E. HELLMUND.
SYSTEM OF MOTOR CONTROL.
APPLICATION FILED OCT. 7, 1915.

1,336,561.                                      Patented Apr. 13, 1920.
2 SHEETS—SHEET 2.

WITNESSES:
Fred H. Miller
D. C. Davis

INVENTOR
Rudolf E Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF MOTOR CONTROL.

1,336,561.  Specification of Letters Patent.  Patented Apr. 13, 1920.

Application filed October 7, 1915. Serial No. 54,540.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Motor Control, of which the following is a specification.

My invention relates to systems of control for alternating-current motors of the compensated, commutator type and it has for its object to provide a system of control that shall permit of speed adjustment of motors of the character designated throughout a wide range, with good commutation and torque, and with few motor leads and control switches, many of the latter having to carry only small currents.

Figures 1, 2:
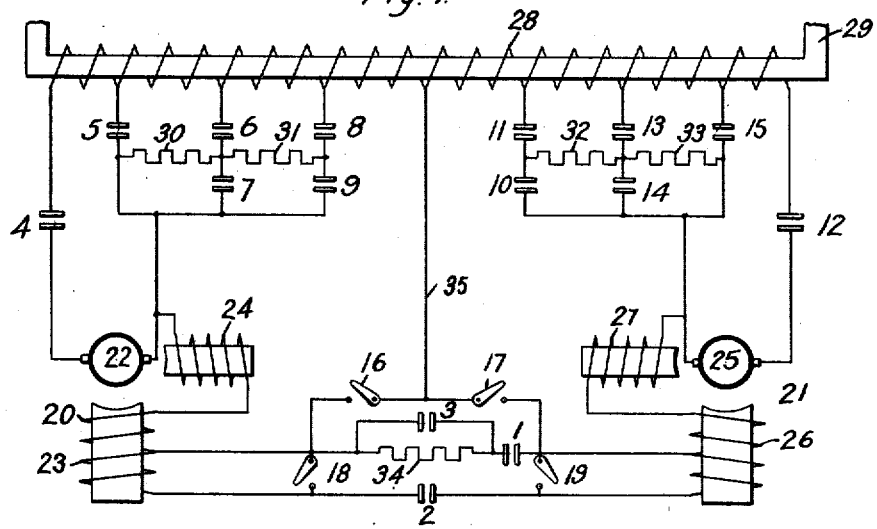

In the accompanying drawing, Figure 1 is a diagrammatic view of two single-phase compensated commutator motors of the doubly-fed type, together with their attendant supply and control circuits, illustrating a preferred embodiment of my invention; Fig. 2 is a sequence chart illustrating the order of switch operation in the circuit of Fig. 1; and Figs. 3 to 9, inclusive, are diagrammatic views illustrating the development of the connections in the circuit of Fig. 1 when the switches thereof are operated in accordance with the chart of Fig. 2.

In the operation of motors of the single-phase, compensated, commutator type, it is essential that the main field be somewhat weakened at starting in order to cut down the induced transformer electromotive force in the coils short circuited by the brushes and thus improve the commutation. A weak main field is also desirable at the end of the accelerating operation in order to provide the necessary high speed. Between these limits there should be a gradual increase in the voltage applied to the armature, while maintaining a strong excitation of the field windings, in order to obtain suitable operating characteristics.

By my invention, I attain the above-mentioned results, together with a well balanced voltage distribution, in a simple and effective manner.

Referring to the accompanying drawing for a more detailed understanding of my invention, I show a pair of doubly-fed commutator motors at 20 and 21, respectively. The motor 20 is provided with an armature 22, a main field winding 23 and a cross field winding 24. In like manner, the motor 21 is provided with an armature 25, a main field winding 26 and a cross field winding 27. Alternating current for the energization of the motors 20 and 21 is derived from any suitable source, such, for example, as the secondary winding 28 of a transformer 29. Current is supplied to the left hand brush of the motor 20 through a suitable control switch 4, and the voltage impressed upon the remaining brush of said motor is adjusted by the suitable manipulation of control switches 5 to 9, inclusive, and preventive resistors 30 and 31 inserted in a double-feed connection of the usual type. In like manner, the right hand brush of the motor 21 is connected directly to the winding 28 through a control switch 12, and the voltage applied to the remaining brush is adjusted by the manipulation of suitable control switches 10, 11, 13, 14 and 15 and preventive resistors 32 and 33. The two main field windings 22 and 26 and the two cross field windings 24 and 27 are connected in series relation between the double-feed taps of the two motors 20 and 21 so that, in normal operation, a portion of the load current passes through all three windings of both motors. The excitation produced by the main field windings 22 and 26 may be reduced by connecting intermediate points thereof through suitable switches 1 and 3 and the excitation produced in each of said field windings may still further be reduced by opening the switch 3, thereby cutting in a suitable resistor 34. In case either motor is disabled, the remaining motor may be connected directly to the winding 28 for emergency operation by means of suitable cutout switches 16 to 19, inclusive, and a neutral connection 35, as is well known in the art.

Figure 3:
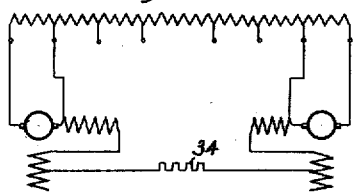
Figure 6:
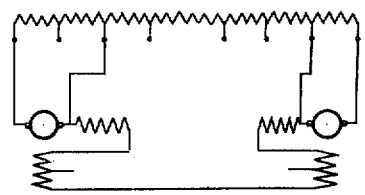
Figure 4:
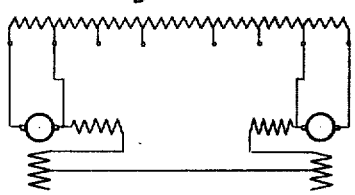
Figure 7:
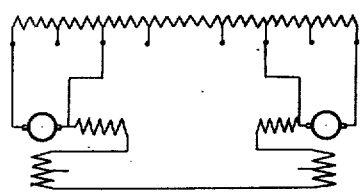
Figure 5:
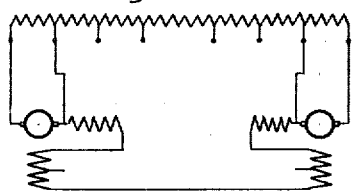
Figure 8:
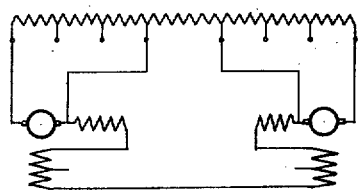
Figure 9:
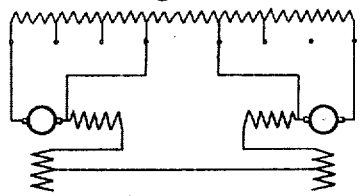

Having thus described the arrangement of a motor-control system constructed in accordance with my invention, the operation is as follows: At the outset, the switches 1, 4, 5, 12 and 15 are closed, as indicated in the accelerating position "A" and as shown in Fig. 3. A minimum voltage is impressed on each armature winding and the field excitation is greatly weakened, both by including only a portion of the main field windings in the circuit and by the in- sertion of the resistor 34. The closure of the switch 3 then removes the resistor 34 from the circuit, establishing the first running position shown in Fig. 4. Suitable manipulation of the switches 1 and 2 then causes the entire main field windings 23 and 26 to become active, thus maintaining the main field excitation at such a value as is necessary for proper torque and providing the accelerating position D suitable for the second running position. In the accelerating positions E and F, the switches 6 and 7 are closed, raising the voltage applied to the armature 2 as shown in Fig. 6 and establishing the third running position. In like manner, the manipulation of the switches 13 and 14 in the accelerating positions G and H establishes the circuit shown in Fig. 7, raising the voltage applied to the armature 25 and establishing the fourth running position. A similar cycle of operations is now repeated by the manipulation of the switches 8, 9, 10 and 11, resulting in still further raising the voltages applied to the armature windings 22 and 25, as shown in Fig. 8, and producing fifth and sixth running positions. Upon approaching the maximum speed, it is necessary, for good commutation, that the main field excitation be slightly weakened and, accordingly, in the accelerating positions M, N and O, the switches 1, 2 and 3 are again manipulated, eliminating a portion of the main field windings 21 and 23 from the circuit, all as shown in Fig. 9.

The cross field windings 24 and 27 are preferably provided with substantially twice as many effective turns as the associated armature windings. Substantially one-half the armature current will return to the winding 28 through the double-feed connection in each motor and only one-half thereof will flow through the field windings. The switches 4 and 12, therefore, are the only ones which need to carry full-load current, and the remaining control switches may be designed for only substantially one-half of full-load current.

It will be noted that, by the system employed, each motor has but six leads and that, by the use of but fifteen control switches, thirteen of which are of relatively small size, two motors may be so controlled as to give seven well distributed running speeds.

The last column in Fig. 3 indicates the character of each accelerating portion, those designated by "A" being suitable merely for acceleration, those by "T" being transition and those by "R" for running.

While I have shown my invention in its preferred form, it will be apparent to those skilled in the art that it is susceptible of various minor changes and modifications without departing from the spirit thereof, and I desire, therefore, that no limitations shall be placed thereupon except such as are imposed by the prior art or are specifically set forth in the appended claims.

I claim as my invention:

1. The combination with a source of alternating current, of two alternating-current motors of the commutator type provided with exciting windings connected thereto in series relation, the exciting windings of the two motors being immediately adjacent in said series connection by virtue of connecting means between the outer terminals thereof, alternative connecting means whereby intermediate points in said field windings may be interconnected, and means for introducing an impedance device into one of said connecting means.

2. The combination with a source of alternating current, of two doubly-fed alternating-current motors connected thereto in series relation, the exciting windings of the two motors being immediately adjacent in said series connection, the inducing field windings being disposed next thereto and the armature windings being arranged at each end of said series, respectively, and means whereby intermediate points in said two exciting field windings may be mutually interconnected through a conducting path of higher resistance than that connecting the outer terminals of said field windings.

3. The method of accelerating two doubly-fed alternating-current motors from a source of alternating current, the elements of said motors being serially connected in the following order between two points of said source, to wit., the armature, inducing field and exciting field windings of one motor and the exciting field, inducing field and armature windings of the other motor, which comprises first reducing the number of active exciting field turns included in said series connection, and then causing the points of connection of the double-feed taps to said source to approach each other.

4. The method of accelerating two doubly-fed alternating-current motors from a source of alternating current, the elements of said motors being serially connected in the following order between two points of said source, to wit., the armature, inducing field and exciting field windings of one motor and the exciting field, inducing field and armature windings of the other motor, which comprises first reducing the number of active exciting field turns included in said series connection, causing the points of connection of the double-feed taps to said source to approach each other, and finally increasing the number of active exciting field turns.

In testimony whereof I have hereunto subscribed my name this 30th day of Sept., 1915.

RUDOLF E. HELLMUND.